(12) United States Patent
Manjunath et al.

(10) Patent No.: US 10,816,986 B2
(45) Date of Patent: Oct. 27, 2020

(54) SYSTEMS FOR VEHICLE COLLISION AVOIDANCE

(71) Applicant: General Electric Company, Schenectady, NY (US)

(72) Inventors: Avinash Hassan Manjunath, Bangalore (IN); Dmitri Fechine, Fountaindale (AU); Steven Clifton, Fountaindale (AU)

(73) Assignee: GE GLOBAL SOURCING LLC, Norwalk, CT (US)

(*) Notice: Subject to any disclaimer, the term of this patent is extended or adjusted under 35 U.S.C. 154(b) by 230 days.

(21) Appl. No.: 16/129,405

(22) Filed: Sep. 12, 2018

(65) Prior Publication Data
US 2019/0025839 A1 Jan. 24, 2019

Related U.S. Application Data

(63) Continuation-in-part of application No. 15/226,151, filed on Aug. 2, 2016, now Pat. No. 10,101,432.

(51) Int. Cl.
G05D 1/02 (2020.01)
B60W 30/09 (2012.01)
G08G 1/16 (2006.01)
G01S 5/02 (2010.01)
G01S 1/70 (2006.01)
G01S 11/12 (2006.01)

(52) U.S. Cl.
CPC .......... *G05D 1/0214* (2013.01); *B60W 30/09* (2013.01); *G01S 1/7038* (2019.08); *G01S 5/0284* (2013.01); *G01S 11/12* (2013.01); *G05D 1/028* (2013.01); *G05D 1/0255* (2013.01); *G05D 1/0257* (2013.01); *G05D 1/0259* (2013.01); *G05D 1/0289* (2013.01); *G08G 1/166* (2013.01); *B60W 2554/801* (2020.02); *G05D 2201/021* (2013.01)

(58) Field of Classification Search
CPC .. G05D 1/0214; G05D 1/0255; G05D 1/0257; G05D 1/0259; G05D 1/028; G05D 1/0289; G05D 2201/021; G01S 1/7038; G01S 5/0284; G01S 11/12; B60W 30/09; B60W 2554/801; G08G 1/166
See application file for complete search history.

(56) References Cited

U.S. PATENT DOCUMENTS 3,949,362 A * 4/1976 Doyle .................... B60Q 1/525
340/435
6,393,362 B1 5/2002 Burns
(Continued)

Primary Examiner — Calvin Cheung
(74) Attorney, Agent, or Firm — Christopher R. Carroll; The Small Patent Law Group LLC

(57) ABSTRACT

A mining vehicle control system includes a detection unit configured to determine a proximity of a monitored mining vehicle to a first mining vehicle and a controller configured to determine first protection lines that linearly project from the first mining vehicle and second protection lines that linearly project from the monitored mining vehicle. The first protection lines are determined based on a moving speed of the first mining vehicle. The second protection lines are determined based on a moving speed of the monitored mining vehicle. The controller is configured to direct the first mining vehicle to change movement of the first mining vehicle responsive to intersection of one or more of the first protection lines with one or more of the second protection lines.

20 Claims, 8 Drawing Sheets

(56) References Cited

U.S. PATENT DOCUMENTS

| | | | |
|---|---|---|---|
| 7,333,012 B1* | 2/2008 | Nguyen | B60R 25/04 340/426.1 |
| 7,603,235 B2 | 10/2009 | Makela et al. | |
| 8,346,468 B2 | 1/2013 | Emanuel et al. | |
| 8,477,021 B2 | 7/2013 | Slack | |
| 9,594,376 B2 | 3/2017 | Larsson | |
| 2005/0187698 A1* | 8/2005 | Arai | B60K 31/0008 701/96 |
| 2007/0182528 A1* | 8/2007 | Breed | B60Q 9/008 340/435 |
| 2008/0077327 A1* | 3/2008 | Harris | G01S 13/931 701/301 |
| 2016/0034771 A1* | 2/2016 | Schamp | G06K 9/00805 348/148 |
| 2016/0170021 A1* | 6/2016 | Rashid | G01S 13/931 342/70 |
| 2017/0294124 A1* | 10/2017 | Baba | G01S 13/931 |
| 2017/0365166 A1* | 12/2017 | Lu | G08G 1/096783 |
| 2018/0072220 A1* | 3/2018 | Yan | G08G 1/166 |
| 2018/0222424 A1* | 8/2018 | Kodama | G08G 1/166 |

* cited by examiner

SYSTEMS FOR VEHICLE COLLISION AVOIDANCE

CROSS-REFERENCE TO RELATED APPLICATIONS

This application is a continuation-in-part of U.S. patent application Ser. No. 15/226,151, which was filed on 2 Aug. 2016, and the entire disclosure of which is incorporated herein.

FIELD

The subject matter described herein relates to mining vehicles and/or rail vehicles.

BACKGROUND

Knowledge of the location of a mining vehicle relative to the environment of the mining vehicle can be crucial, particularly for autonomous mining vehicles and/or mining vehicles operating in areas without clear lines of sight. There are several systems which utilize electromagnetic energy to detect objects within an environment and to measure relative distances between objects. For example, conventional electromagnetic energy ("EM")-based distance measuring systems typically use received signal strength indicators for proximity detection, while an EM carrier signal can be modulated with transmitter identification data. Due to the EM frequency being very low (e.g., on the order of a few kilohertz), transmission of data on the carrier signal can take a long time. This, in turn, can reduce how many transmitters can be reliably identified within a given space or environment and within a limited amount of time. Additionally, the time needed for measuring distances can be quite long and may not be suitable for vehicles moving at higher speeds.

Another issue associated with existing EM-based distance monitoring systems is the need to negotiate, in real-time, transmission slots for the EM transmitters within the given environment or reception area to avoid on-air collisions. In environments where the number of transmitters is fluid (e.g., where a growing number of transmitters randomly move in an out of the environment or reception area, such as on roadways), and given the relatively long duration of EM broadcasts, this problem can quickly become unmanageable. This problem can limit how many transmitters can be used at the same time to just a small few and can increase distance update periods to seconds rather than milliseconds.

Other known systems utilize global positioning system (GPS) tracking to determine the position of vehicles within an area, for use in collision avoidance and reporting, for example. While generally suitable for above ground applications, GPS tracking is not available underground, rending such systems particularly unsuitable for underground mining applications and the like.

In view of the above, there may be a need for a position and proximity detection system and method which differ from those systems and methods that are currently available.

BRIEF DESCRIPTION

In one embodiment, a mining vehicle control system includes a control unit configured to be disposed onboard a mining vehicle to control movement of the mining vehicle and one or more transceiver devices configured to emit an electromagnetic (EM) pulse and a radio frequency (RF) signal from the mining vehicle. The one or more transceiver devices are configured to emit the RF signal with an identity of the mining vehicle included in the RF signal. Responsive to a receiver unit disposed off-board the mining vehicle in a mine receiving the EM pulse and the RF signal, the control unit is configured to determine a distance between the mining vehicle and the receiver unit based on the EM pulse and the RF signal that are received, and to communicate a signal to the one or more transceiver devices based on the distance. The control unit also is configured to change the movement of the mining vehicle based on the distance.

In one embodiment, a mining vehicle control system includes a detection unit configured to determine a proximity of a monitored mining vehicle to a first mining vehicle and a controller configured to determine first protection lines that linearly project from the first mining vehicle and second protection lines that linearly project from the monitored mining vehicle. The first protection lines are determined based on a moving speed of the first mining vehicle. The second protection lines are determined based on a moving speed of the monitored mining vehicle. The controller is configured to direct the first mining vehicle to change movement of the first mining vehicle responsive to intersection of one or more of the first protection lines with one or more of the second protection lines.

In one embodiment, a method for avoiding collision between mining vehicles is provided. The method includes determining a proximity of a monitored mining vehicle to a first mining vehicle and determining first protection lines that linearly project from the first mining vehicle. The first protection lines are determined based on a moving speed of the first mining vehicle. The method also includes determining second protection lines that linearly project from the monitored mining vehicle. The second protection lines are determined based on a moving speed of the monitored mining vehicle. The method also includes changing movement of the first mining vehicle responsive to intersection of one or more of the first protection lines with one or more of the second protection lines.

In an embodiment, a system includes a vehicle having an emitter configured to emit a high RF signal synchronously with at least one EM pulse. The system also includes a receiver unit located remote from the vehicle. The receiver unit includes a magnetic field receiver, an RF transceiver, and a processing module coupled to the RF transceiver and the magnetic field receiver. The receiver unit is configured to receive the high RF signal and the at least one EM pulse from the vehicle and to determine a proximity of the vehicle to the receiver unit based on at least one of the high RF signal or the at least one EM pulse.

In an embodiment, a method includes, with an emitter on board a first vehicle, emitting a high RF signal synchronously with at least one EM pulse. The method further includes, with a receiver unit located remote from the first vehicle (the receiver unit includes a magnetic field receiver, an RF transceiver, and a processing module coupled to the RF transceiver and the magnetic field receiver), receiving the high RF signal and the at least one EM pulse from the first vehicle. The method further includes, with the receiver unit, determining a proximity between the first vehicle and the receiver unit based on at least one of the high RF signal or the EM pulse.

In an embodiment, a system includes a receiver unit having a magnetic field receiver, an RF transceiver, and a processing module coupled to the RF transceiver and the magnetic field receiver. The RF transceiver is configured to receive a high RF signal from a vehicle that is remote from the receiver unit. The magnetic field receiver is configured to receive at least one EM pulse from the vehicle. The processing module is configured to verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module is further configured, responsive to verification that the emission did not occur synchronously, to reject the high RF signal and the at least one EM pulse for use in determining the proximity.

In an embodiment, a system includes a vehicle having an on-board navigation system configured to determine a position of the vehicle within a reception area without external references. The system also includes at least one beacon positioned at a location within the reception area along a route over which the vehicle travels. The at least one beacon stores location data of the at least one beacon within the reception area. The vehicle is configured to wirelessly receive the location data from the at least one beacon when the vehicle passes within range of the at least one beacon.

BRIEF DESCRIPTION OF THE DRAWINGS

The inventive subject matter will be better understood from reading the following description of non-limiting embodiments, with reference to the attached drawings (wherever possible, the same reference characters used throughout the drawings refer to the same or like parts), wherein below.

DETAILED DESCRIPTION

Embodiments of the inventive subject matter relate generally to detecting the proximity of objects within a reception area. Certain embodiments relate to systems and methods for detecting the proximity of objects or vehicles in relation to a subject vehicle within a reception area or environment. In one embodiment, a system for proximity detection includes a first vehicle having an emitter configured to transmit/emit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit is configured to receive the high RF signal and the at least one EM pulse from the first vehicle and to determine a proximity of the first vehicle to the receiver unit. In one embodiment, the proximity of the first vehicle to the receiver unit is calculated in dependence upon received magnetic field strength. While the description herein focuses on mining vehicles or vehicles operating in subsurface or underground environments, not all embodiments of the inventive subject matter are limited to mining vehicles. One or more embodiments may be used for proximity detection and/or collision avoidance for other types of vehicles, such as automobiles (manually driven and/or autonomous or driverless cars), rail vehicles, trucks, buses, marine vessels, aircraft, or the like. Optionally, one or more embodiments may be used with mining vehicles that extract resources from above-ground or above-surface locations, such as an open pit containing mining resources.

Figure 1:
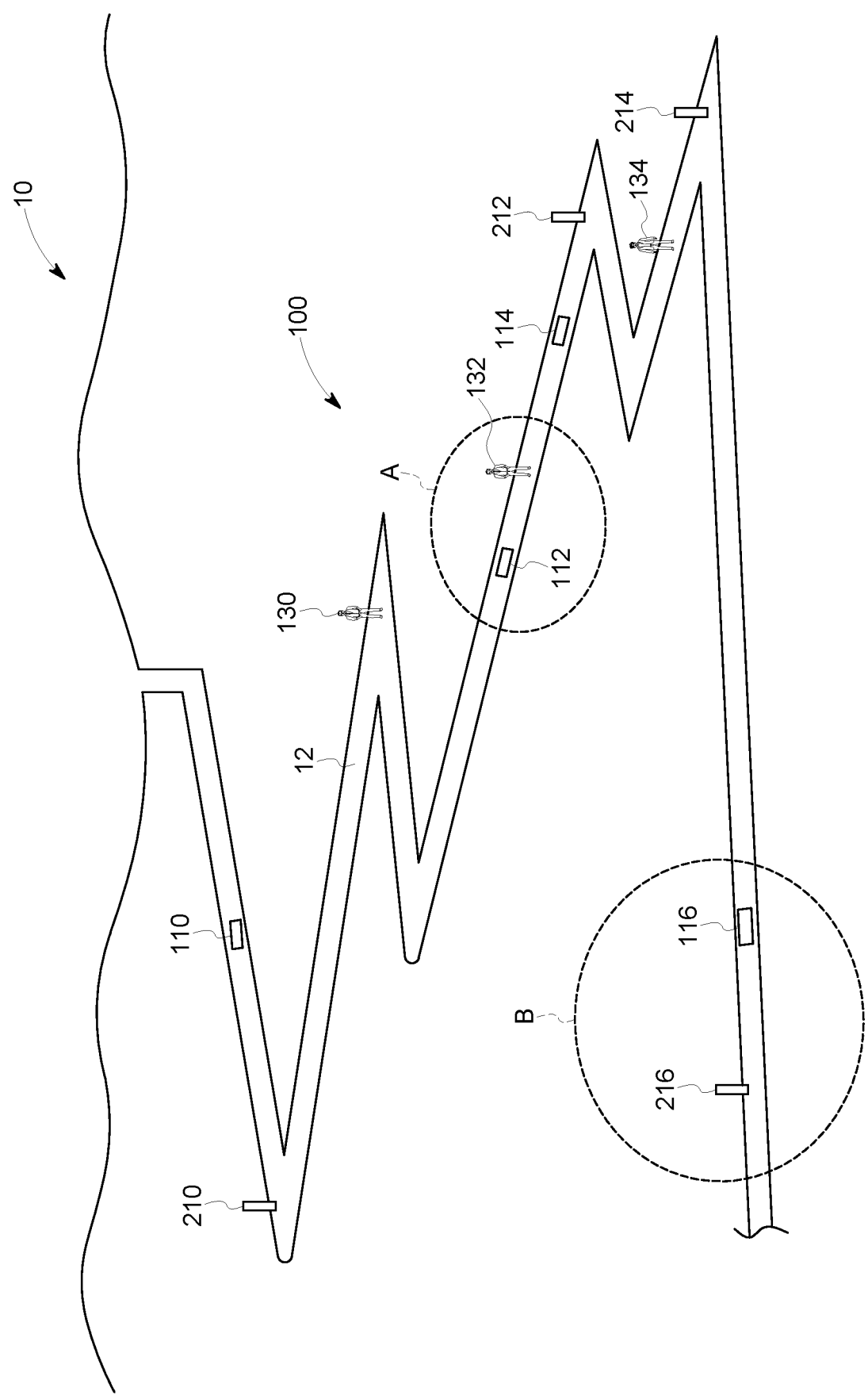
FIG. 1 is a simplified schematic illustration of a reception area showing a plurality of vehicles and personnel with which a position and proximity detection system may be utilized, according to one embodiment.

FIG. 1 schematically illustrates a reception area or environment 10 within which a position and proximity detection system 100 according to one embodiment. The system 100 optionally can be referred to as a mining vehicle collision avoidance system or a vehicle collision avoidance system. The reception area 10 may be an underground mine having a route 12 along which a plurality of mining vehicles and personnel are configured/designated to travel and operate. In an embodiment, the route 12 may be a haul route for the vehicles. In other embodiments, the reception area 10 may be any loosely defined area into and out of which vehicles or objects travel, such as a body of water (within which marine vessels travel), a roadway (on which automobiles, e.g., driver or driverless automobiles travel), a railway (on which locomotives travel), or other environment. As used herein, "reception area" means an area surrounding a vehicle or object equipped with a proximity detection unit described herein.

Figure 2:
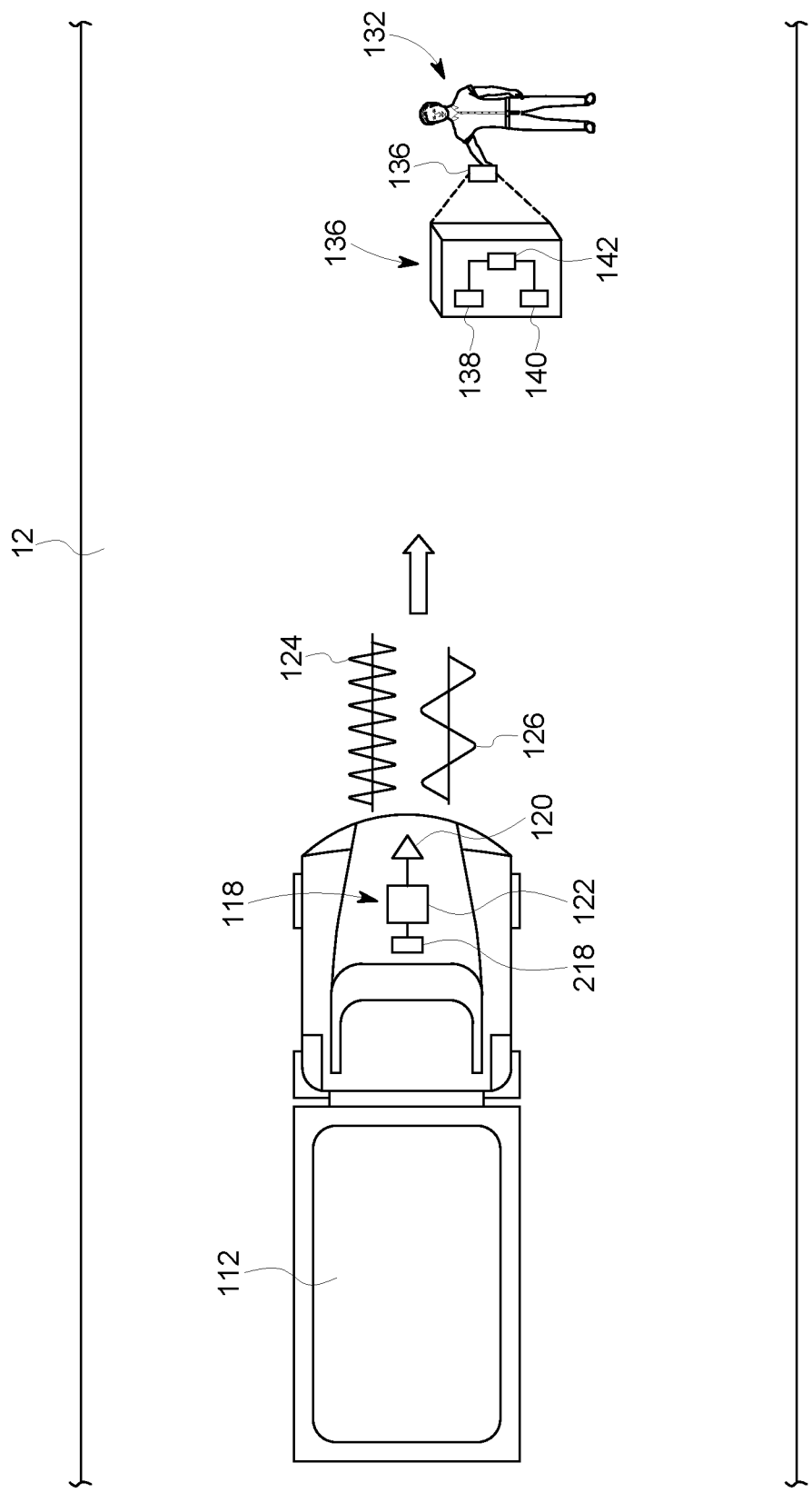
FIG. 2 is detail view of area A of FIG. 1, showing a vehicle equipped with a proximity detection system according to one embodiment.

The position and proximity detection system 100 includes one or more proximity detection units 118 disposed onboard one or more vehicles (e.g., vehicles 110, 112, 114, 116). As illustrated in FIG. 2, each proximity detection unit 118 includes a transceiver 120 and a control unit 122 (e.g., microprocessor-based circuit) electrically connected or otherwise communicatively coupled to the transceiver 120. In certain embodiments, the transceiver 120 may be separate transmitter/emitter and receiver devices. The proximity detection unit 118, including the transceiver 120, may be mounted anywhere within the vehicle 112 such as, for example, in the trunk of the vehicle or in an engine compartment of the vehicle. The transceiver 120 may be any type of transceiver known in the art and includes at least first and second output channels. In an embodiment, the first output channel is a high frequency RF channel and the second output channel is low frequency EM channel. The transceiver 120 is configured to generate both high radio frequency ("RF") signals, e.g., RF signal 124 (e.g., an RF broadcast), and EM pulse transmissions, e.g., EM pulse 126, utilizing the first and second channels, respectively.

As discussed hereinafter, the proximity detection units 118 are configured to detect vehicles or other objects within the reception area 10. In an embodiment, the transceiver 120, under control of the control unit 122, is configured to generate an unmodulated, short EM pulse 126 (e.g., a few oscillation cycles) synchronously with a modulated, RF signal 124 via the first and second channels, respectively. The EM pulse 126 and the RF signal 124 are of fixed duration. In an embodiment, EM pulse 126 does not carry any data and is only used for signal strength (distance)

measurements, while the high RF signal 124 carries the identifying information of the transceiver 120 (i.e., it is modulated with a transceiver/emitter ID or vehicle ID). In an embodiment, the ID (e.g., identity or identification) may be protected by a checksum.

With further reference to FIGS. 1 and 2, the system 100 also includes one or more receiver units 136 carried by, or associated with, objects or personnel within the reception area such as, for example, persons 130, 132, 134. The receiver units 136 each include an alternating or constant magnetic field receiver 138, an RF transceiver 140, and a processing module 142 (e.g., processor circuit) electrically connected to the magnetic field receiver 138 and RF transceiver 140. In an embodiment, the processing module 142 may be provided with information of the strength of the magnetic field emitted by the proximity detection units 118 of the system 100 (e.g., stored in non-transitory memory), as well as a lookup table or algorithm through which the processing module 142 may calculate the distance from the vehicle that generated the EM pulses, as discussed in detail hereinafter.

Figure 3:
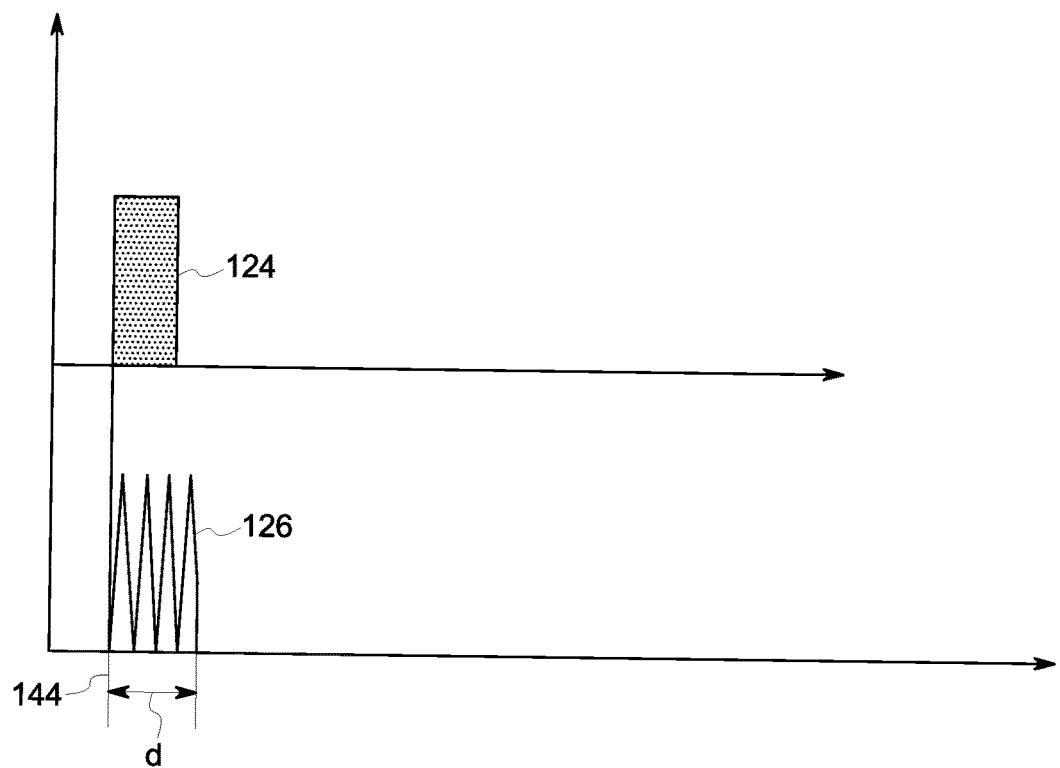
FIG. 3 is a diagram illustrating one embodiment of synchronous transmissions carried out by the proximity detection system.

In operation, as the vehicles 110, 112, 114, 116 travel throughout the reception area 10, the proximity detection units 118 onboard each vehicle synchronously transmit the RF signal 124 (carrying the transceiver/emitter and/or vehicle ID) and EM pulses 126 via the emitter (e.g., transceiver 120). For example, as illustrated in FIG. 2, the proximity detection unit 118 onboard the first vehicle 112 generates the RF and EM transmissions 124, 126, respectively, which then propagate through space until the transmissions reach another vehicle or object within the reception area 10 (such as person 132 carrying receiver unit 136). The magnetic field receiver 138 of the receiver unit 136 receives the EM pulses 126, while the RF transceiver 140 receives the RF signal 124. The start time of the received RF signal 124 and the start and stop time of the detected EM pulse 126 are recorded by the processing module 142 and are used to verify the EM pulse duration and synchronicity of the EM pulse with the RF signal to link the RF signal 124 and EM pulses 126 to one another. With reference to FIG. 3, a synchronous start 144 of the RF signal 124 and EM pulse 126 is verified on the receiving end (e.g., at the receiving unit 136). Likewise, the EM pulse duration, d, is measured on the receiving end (e.g., at the receiving unit 136). This ensures that no two EM transmissions from two different transmitters can be mistaken for each other on the receiving end. The transmissions are either received clearly and accepted, or rejected if the RF signal checksum fails or the EM signal duration is measured incorrectly due to a rare RF collision or EM noise.

Moreover, the control unit 122 may employ a listen-before-talk mechanism with a random back-off delay on the high RF channel to arbitrate concurrent communications from competing transceivers, such as transceivers deployed on other vehicles within the reception area 10. The control unit 122 may sense or "listen" to the radio environment within the reception area 10 prior to generating the transmissions to prevent concurrent transmission from competing transceivers. The control unit 122 can be configured to ensure that the reception area 10 is clear of competing transmission prior to RF and EM transmission.

The processing module 142 of the receiver unit 136 receives the RF transmission 124 and EM pulses 126, and links the transmissions 124, 126 to one another to verify the source. The processing module 142 determines the distance between the receiver unit 136 (carried by person 132) and the emitter 120 on-board the first vehicle 112 (and thus the vehicle 112) based on the strength of the received magnetic field. A certain level of a received signal indicates a certain distance. For example, in certain embodiments, the distance measurement may be based on the generated magnetic field intensity. The generated field power can be calibrated and known. The relationship between field intensity and distance also can be known and sampled. The transceiver/receiver that receives the transmissions measures the field intensity and matches the field intensity with a prerecorded distance in a lookup table stored in memory of the processing module 142. In other embodiments, a model based on the known physical formulas for EM field propagation can be utilized.

As indicated above, the processing module 142 of the receiver unit 136 may be preconfigured with the emitted field strength (which is typically a fixed value for the entire system 100). In other embodiments, the strength of the field emitted by the proximity detection unit 118 may be transmitted from the proximity detection unit 118 to the receiver unit 136 via the RF channel in addition to the transceiver/vehicle ID information. The emitted field strength and the received field strength values may then be utilized by the processing module 142 to calculate or determine the distance from the first vehicle 112 from which the transmissions were made, such as via a lookup table or algorithm stored in memory. Once the field strength has been converted to a distance measurement by the processing module 142 of the receiver unit 136, this measurement is communicated back to the proximity detection unit 118 of the first vehicle 112 via the RF channel (e.g., RF transceiver 140 to originating transceiver 120). This distance measurement may then be used by control unit 122 onboard the first vehicle 112 to determine a vehicle action to be taken (e.g., continue on route, change route, slow, stop, notify an operator, etc.). Alternatively, the control unit 122 of the proximity detection unit 118 can receive RF signals and/or EM pulses emitted by other proximity detection units 118, and can measure the distances to the other proximity detection units 118 as described herein in connection with the receiving unit 136.

In addition to communicating the distance measurement back to the originating transceiver 120 of the first vehicle 112, the receiver unit 136 and/or control unit 122 may also be configured to generate an alarm or alert if a preset 'safety' distance threshold has been breached. In an embodiment, the alert may be an audible alarm, a visual alert, or other sensory alert. For example, the receiver unit 136 and/or control unit 122 may include one or more LEDs, vibrators, speakers or the like for attracting a user's attention to the fact that the preset safety threshold has been breached. This alert may prompt an operator to increase the distance between himself/herself and the vehicle, or to seek a safe location until the vehicle passes by.

The proximity detection system 100 can be configured to determine the proximity of vehicles operating within the reception area 10 to any object or person outfitted with a receiver unit 136, and to generate alerts or notifications (either at the receiver unit 136 or the vehicles themselves, or both). In this way, operational safety within the reception area may be increased, and bottlenecking or backups may be minimized.

In certain embodiments, the transceiver 120 onboard the vehicles may include an EM or constant magnetic field receiver, so that distances between vehicles may be determined.

It is contemplated that the RF transmission frequency of the high RF signal may include all frequencies within the megahertz (MHz) to gigahertz (GHz) range. Thus, in an embodiment, the high RF signal is at least 1 MHz. In various embodiments, the RF signal frequency is on the lower end of the MHz to GHz range. The higher the frequency, the quicker the signal, which allows more vehicles to be present within the reception area as compared to existing systems. Accordingly, a higher frequency may be utilized where a high volume of vehicle traffic is anticipated. In certain embodiments, the frequency for the RF signal may be selected in dependence upon a number of factors including the number of vehicles that are anticipated or estimated to be present in a particular reception area at a given time and the particular application for which the system is used (e.g., on a roadway, within an underground mine, etc.). For example, in underground mining applications, it may be desirable to use a lower frequency for the RF signal, where a direct line-of-sight between vehicles operating within the space is not always present. This is because the lower the frequency, the less dependent the system is on the availability of a direct line-of-sight (which is often not possible within the many twists and turns of a mine), due to the RF wave diffraction (e.g., bending around corners) and the ability to penetrate walls within the mine.

In an embodiment, the EM frequency may be as low as zero (i.e., a constant magnetic field, but not electrical). In such a case, the detector of the transceiver will sense a momentary change in the magnetic field of the earth and derive the induced vector from the change in the magnetic field, based on a pre-measured baseline. In an embodiment, the EM frequency is selected to be as low as possible, as there are less induced currents in metallic objects placed in between the transmitter and receiver, and there is less of the associated field intensity loss due to such induced currents. In addition, selecting a low frequency for the EM pulses achieves a much higher immunity to various EM noises coming from possible electrical and electronic devices located within the reception area. Utilizing a constant magnetic field allows any alternating EM noise to be filtered out. In connection with the above, utilizing a constant magnetic field is possible because the EM field is not used as a data carrier. This has heretofore not been possible with existing systems, because the EM field had typically been used as a data carrier.

Because of the much shorter transmission time as compared to existing electromagnetic energy-based distance measuring systems, the time taken to measure the distance between the transmitter and receiver (e.g., the distance between vehicles), and to uniquely identify the transmitter, is greatly reduced. The systems and methods described herein can allow transmission times to be reduced from about 100 to about 500 times compared to some known systems and methods. Moreover, the multiple transceiver time slot arbitration issue present in some existing systems can be resolved by using a listen-before-talk mechanism employed by one or more embodiments of the control unit described herein. This, in turn, allows for more vehicles or objects to operate within the reception area, and for shorter periods of time between the distance measurements.

While the system 100 described above may be utilized to determine the proximity of vehicles to any mine personnel and other objects carrying or outfitted with a receiver unit to prevent vehicle incursions into areas where personnel are operating, there may also remain a need to determine the absolute position of the vehicles 110, 112, 114, 116 within the mine or reception area 10, irrespective of other personnel or objects within the reception area. To address this issue, the vehicles 110, 112, 114, 116 operating within the reception area may also be outfitted with an on-board navigation system that is configured to determine or calculate the position of the vehicle within the reception area 10 (e.g., an underground mine), and the reception area 10 may be configured with a plurality of fixed-position beacons 210, 212, 214, 216 that are configured to communicate with the vehicles, as further shown in FIG. 1.

The beacons 210, 212, 214, 216 each include a respective transceiver unit that enables communication with the vehicles when the vehicles are in range, such as, for example, by way of radio communications. In an embodiment, the beacons 210, 212, 214, 216 are configured to transmit the positions/locations of the beacons within the reception area 10 to the vehicles that pass within range of the respective beacon. In other embodiments, the beacons 210, 212, 214, 216 are configured to transmit identifying information to the vehicles within range, which may then be cross-referenced with a database on-board the vehicle that indicates the specific location of the communicating beacon within the reception area 10 based on the received beacon ID.

Figure 4:
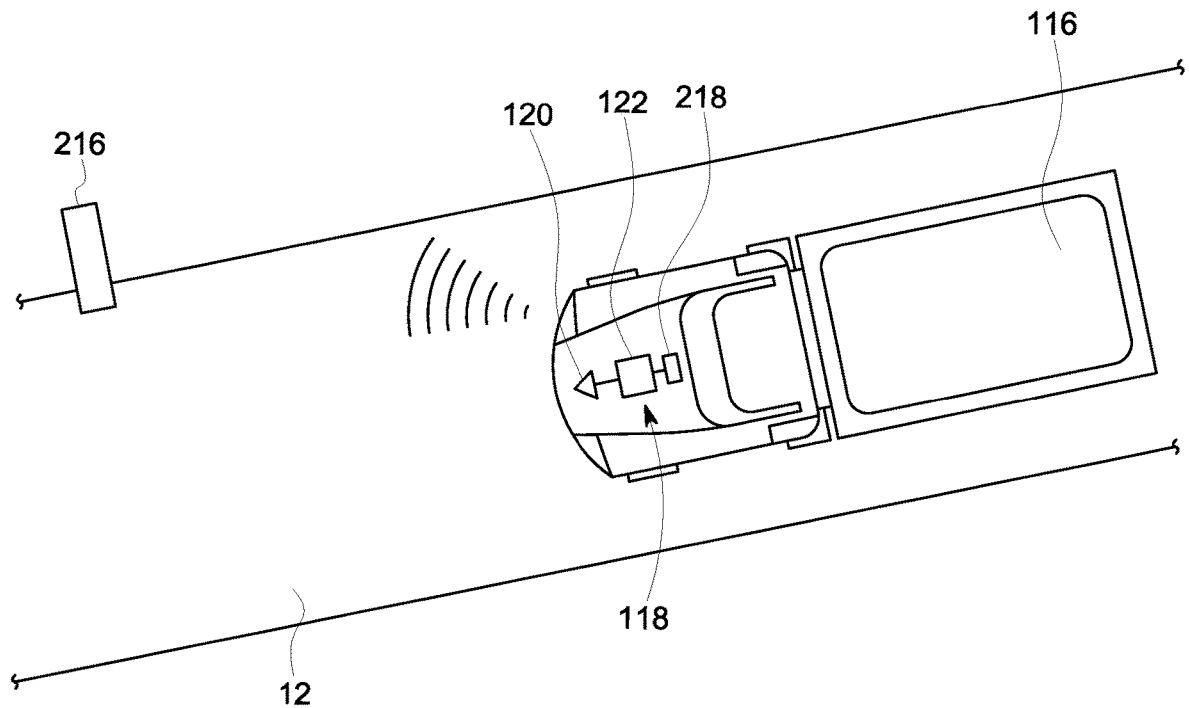
FIG. 4 is a detail view of area B of FIG. 1.

With reference to FIG. 4, the navigation system 218 onboard each vehicle (e.g., vehicle 116) includes an inertial platform type navigation device that may employ, for example, motion sensors (accelerometers) and rotation sensors (gyroscopes) to continuously calculate via dead reckoning the position, orientation, and velocity (e.g., direction and speed of movement) of the vehicle 116 without the need for external references. The vehicle 116 is configured to communicate with the beacons 210, 212, 214, 216, as well as with other vehicles, when the vehicle 116 is in range. For example, as shown in FIG. 4, the vehicle 112 is configured to communicate via the transceiver 120 of the vehicle 112 with beacon 216 as the vehicle 112 passes by the beacon 216. In an embodiment, the transceiver 120 and control unit 122 may be the same transceiver and control unit used for proximity detection, as discussed above. In other embodiments, the transceiver 120 and control unit 122 may be standalone devices.

In operation, each vehicle (e.g., vehicle 116) is configured to maintain a history or log of the exact movements of the vehicle throughout a given area, such as along the haul route 12, using the navigation device 218 onboard the vehicle 112. Each vehicle 116 is configured to calculate the position of the vehicle within the reception area 10, using the onboard navigation device 218 and via dead reckoning. The recorded position of the vehicle 116 may then be transmitted or broadcast (such as through a radio link) to other vehicles within range, such as vehicles 112, 114, to ensure that collisions are avoided. During vehicle travel, however, the estimated position of each vehicle (as determined by the on-board navigation device 218) may vary from the actual position of each such vehicle. The system 100 is configured to zero out any such accumulated error or drift (e.g., the actual position of the vehicle in relation to the estimated position as determined by the navigation device 218) through use of the beacons 210, 212, 214, 216.

As the vehicles 110, 112, 114, 116 pass within range of the beacons 210, 212, 214, 216 (the exact position of which are known and logged, as discussed above), the estimated position of any such vehicle is updated with a precise, known position received from the beacon. As a result, while drift or error in the estimated position of a vehicle can accumulate as the vehicles are traveling between beacons, passing by any beacon within the reception area 10 essentially resets or recalibrates the control unit 122 and navigation device 218, preventing any accumulated error or drift from propagating throughout an entire path of travel of the vehicle.

In an embodiment, the position determination system 100 also may be utilized to create a data breadcrumb trail for subsequent use by mine operators for incident playback and the like. The path of travel (including time and location) of each vehicle may be logged by the on-board control unit 122 and transmitted back to the surface when the vehicle is in range (for example) of a Wi-Fi access point or a leaky feeder system within the mine. This data can be used for efficiency, tire wear, uptime, tracking in use time vs. idle time, etc.

While FIG. 1 shows the proximity detection system (e.g., vehicles equipped with an RF and EM pulse emitter/transmitter and objects and personnel outfitted with receiver units to calculate vehicle proximity) and the position determination system (e.g., vehicles equipped with an on-board navigation system and which are configured to communicate with static beacons within the reception area) as being a single, integrated system, the system may be separate systems that can be deployed independently or in conjunction with one another. The proximity detection capabilities may be deployed irrespective of position determination functionality, and vice versa. For example, in an embodiment, the system 100 may include the vehicles outfitted with navigation systems that are configured to estimate the position of the respective vehicle within the reception area, and the beacons arranged at various locations within the reception area 10 that provide the vehicles passing thereby with known (or absolute) reference points so that any accumulated navigational error can be zeroed out. In other embodiments, the system 100 may include vehicles outfitted with proximity detection units that are configured to emit RF signals and EM pulses, and objects or personnel carrying receiver units that are configured to receive the RF signals and EM pulses and calculate the proximity of the emitting vehicles. That is, proximity detection and position determination functionality may be integrated into a single, comprehensive system, or may deployed separately and independently from one another.

In one embodiment, the transceivers 120 of proximity detection units 118 onboard vehicles can receive the EM pulses 126 and RF signals 124 sent from the transceivers 120 of other proximity detection units 118 to detect the proximity of vehicles to each other and/or to other objects. For example, a first proximity detection unit 118 onboard a first vehicle can send EM pulses 126 and RF signals 124 that are received by a second proximity detection unit 118 of a second vehicle. The control unit 122 of the second proximity detection unit 118 can determine how far the first vehicle is from the second vehicle in the manner described above in connection with the receiver unit 136.

Optionally, the system 100 may be used to detect the proximity (e.g., distance between) mining equipment and a target location. For example, mining vehicles may include elongated drill tips or other equipment used to mine for resources. The system 100 can be used to measure or otherwise determine how far the equipment is from other equipment or vehicles. This can help prevent collisions between equipment that may project far from a mining vehicle and other vehicles, or collisions between projecting equipment on different vehicles. For example, the transceiver can be disposed on or near outer ends of mining equipment that projects from a vehicle (e.g., at or near the end of a drill tip). The transceivers or beacons can be disposed on other vehicles, other equipment, and/or persons to ensure that the mining equipment does not collide with the other vehicles, equipment, or persons. Additionally, a target location can be provided with the transceiver or beacon, and mining equipment can be provided with the transceiver or beacon. The system can then be used to track how far the mining equipment (e.g., the drill tip) is from a target location (an identified location of resources to be mined).

In any of the embodiments herein, the high RF signal may be a high RF broadcast, referring to a signal that is transmitted generally throughout an area and without a particular or designated recipient.

In an embodiment, a system is provided. The system includes a first vehicle having an emitter configured to emit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit is configured to receive the high RF signal and the at least one EM pulse from the first vehicle and to determine a proximity of the first vehicle to the receiver unit. In an embodiment, the high RF signal is modulated with an emitter/transceiver ID and/or vehicle ID. In an embodiment, the emitter or vehicle ID is protected by a checksum. In an embodiment, the at least one EM pulse does not carry any data. In an embodiment, the proximity of the first vehicle to the receiver unit is calculated in dependence upon received magnetic field strength. In an embodiment, the processing module of the receiver unit is configured to generate an alert if the determined proximity of the first vehicle is within a preset range. The alert may be at least one of an audible alert, a visual alert, and/or a vibratory alert. In an embodiment, the receiver unit is configured to communicate the determined proximity back to the first vehicle. In an embodiment, the first vehicle is a mining vehicle operating in an underground mine. In an embodiment, the receiver unit is configured to verify that the RF signal and the at least one EM pulse occurred synchronously.

In another embodiment, a method is provided. The method includes the steps of, at a first vehicle, synchronously generating a high RF signal and at least one EM pulse; at a receiver unit, receiving the high RF signal and the at least one EM pulse; and at the receiver unit, determining a distance between the first vehicle and the receiver unit in dependence upon a strength of the at least one EM pulse received by the receiver unit. In an embodiment, the method may also include the step of, prior to generating the high RF signal and the at least one EM pulse, checking for a competing transmission from a second vehicle. In an embodiment, the method may also include the step of, at the receiver unit, verifying that the transmission of the high RF signal and the at least one EM pulse occurred synchronously. In an embodiment, the method may also include the step of, at the receiver unit, measuring a duration of the at least one EM pulse. In embodiment, the method may also include the step of modulating the high RF signal with a transceiver ID and/or vehicle ID. In an embodiment, the transceiver or other ID is protected by a checksum. In an embodiment, the at least one EM pulse does not carry any data. In an embodiment, the first vehicle is an autonomous vehicle. In an embodiment, the method may also include, at the receiver unit, generating an alert if the distance is below a predetermined threshold or within a preset range. In an embodiment, the method may further include the step of communicating the determined distance back to the first vehicle.

In an embodiment, a system includes a receiver unit having a magnetic field receiver, an RF transceiver, and a processing module coupled to the RF transceiver and the magnetic field receiver. The RF transceiver is configured to receive a high RF signal from a vehicle that is remote from the receiver unit. The magnetic field receiver is configured to receive at least one EM pulse from the vehicle. The processing module is configured to verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module is further configured, responsive to verification that the emission did not occur synchronously, to reject the high RF signal and the at least one EM pulse for use in determining the proximity.

In another embodiment, a system includes a first vehicle having an on-board navigation system configured to determine a position of the first vehicle within a reception area without external references, and at least one beacon positioned at a location within the reception area along a route over which the first vehicle travels. The at least one beacon stores location data of the at least one beacon within the reception area. The first vehicle is configured to wirelessly receive the location data from the at least one beacon when the first vehicle passes within range of the at least one beacon. For example, the first vehicle and the at least one beacon may be configured to communicate over a radio link.

In an embodiment, a system includes a first vehicle having an on-board navigation system configured to determine a position of the first vehicle within a reception area without external references, and at least one beacon positioned at a location within the reception area along a route over which the first vehicle travels. The at least one beacon stores location data of the at least one beacon within the reception area. The first vehicle is configured to receive the location data from the at least one beacon when the first vehicle passes within range of the at least one beacon. The first vehicle includes a receiver and a control unit electrically coupled to the receiver and the navigation system. The control unit is configured to utilize the location data from the at least one beacon to eliminate errors in the position of the first vehicle as determined by the navigation system. In an embodiment, the navigation system is configured to determine the position of the first vehicle via dead reckoning.

The control unit 122 of the collision avoidance system 100 optionally can be included in a mining vehicle control system that also includes and/or operates with the collision avoidance system 100. The control unit can be communicatively coupled with a propulsion system and/or braking system of a mining vehicle. For example, the control unit can communicate with and control one or more engines, motors, transmissions, brakes, or the like, of the mining vehicle to control and change movement of the vehicle. The control unit can control or change movement of the mining vehicle based on the distance of one or more objects (e.g., equipment, a target location, a person, and/or another vehicle) to the mining vehicle being too small (e.g., less than a safety threshold distance). For example, a receiver unit can receive the EM pulse and the RF signal and determine a distance between the mining vehicle and the receiver unit based on the EM pulse and the RF signal that are received. The receiver unit can then communicate a signal to one or more transceiver devices of the control system based on the distance. The control unit can examine this distance and change the movement of the mining vehicle (e.g., to avoid collision with the other object). For example, if the distance between the vehicle and other object is too short and/or is decreasing, the control unit can change the throttle setting and/or apply the brakes of the vehicle to slow or stop movement of the vehicle. As another example, the control unit can change a direction in which the vehicle is moving to avoid collision with the other object.

The mining vehicle collision avoidance system optionally can use a point-quadrant-based vehicle-to-vehicle alarm logic to provide a solution for vehicle-to-vehicle collision avoidance in a mining environment. This logic can be applied by the control units and/or processing modules described herein. The location and/or heading of mining vehicles can be determined in one or more of a variety of different ways, such as using the EM pulses and RF transmissions described above, using data obtained by GPS receivers, calculating distances based on times-of-flight of electromagnetic signals (that reflect off other objects, such as radar), structured light arrays, or the like. In the case of another moving vehicles, the processing module can determine a heading of the other vehicle and/or a location of the other vehicle. In the case of another stationary vehicle, the processing module can determine a location of the other vehicle (as the stationary vehicle would not have a heading).

The locations and/or headings determined by the processing module can be communicated to the control unit of a vehicle to determine whether to advise the operator of the vehicle to slow or stop movement of the vehicle, and whether to automatically slow or stop movement of the vehicle (if the operator does not respond or change movement of the vehicle according to the advice provided). Optionally, the control unit may advise the operator to change a heading of the vehicle and/or automatically change the heading of the vehicle if the operator does not change the heading. The advice and/or automatic control provided by the control unit can prevent collisions between the vehicle and other objects (e.g., other vehicles, persons, mining equipment, etc.).

Figure 5:
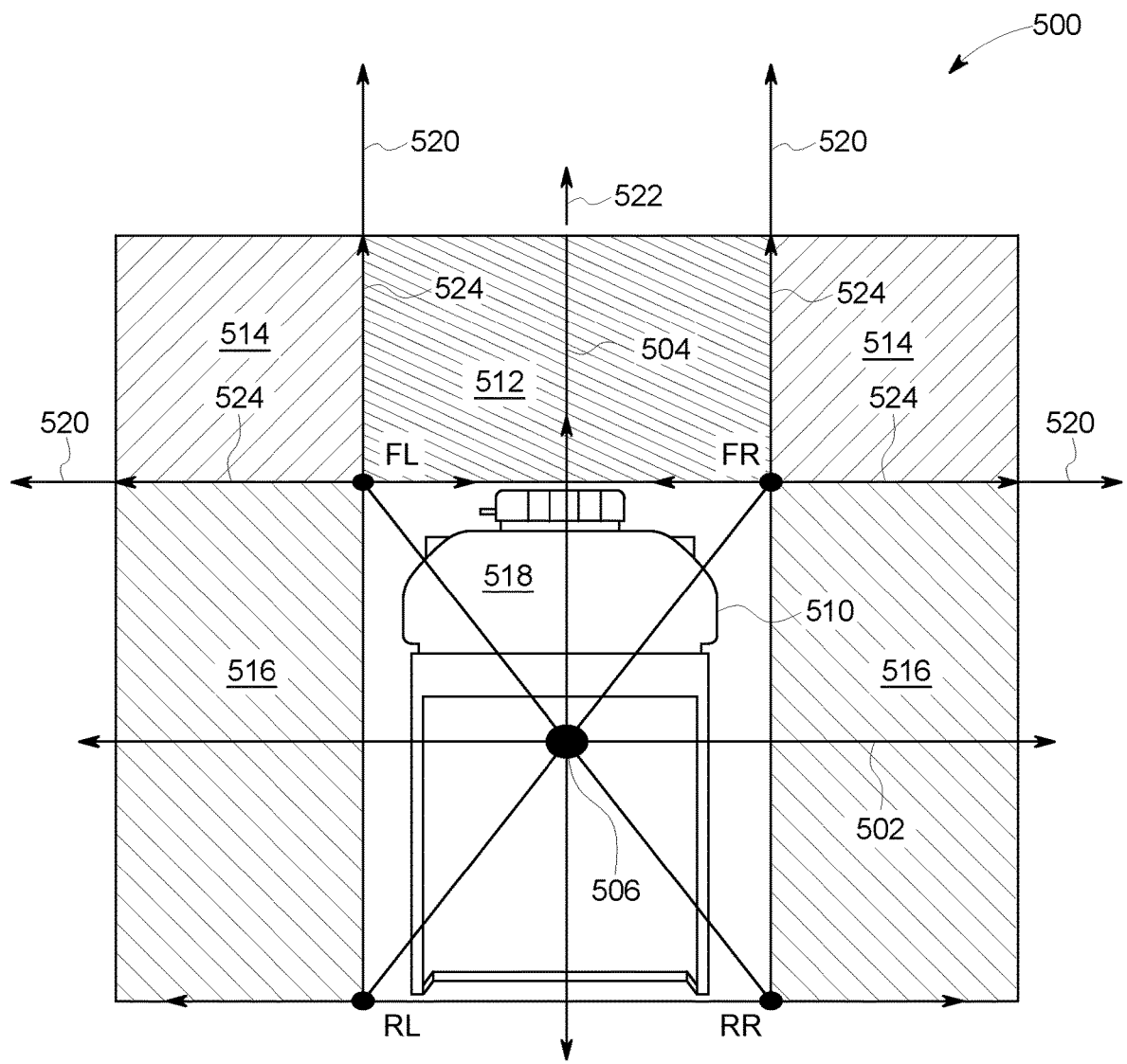
FIG. 5 illustrates one embodiment of a mining vehicle collision avoidance system.

FIG. 5 illustrates one embodiment of a mining vehicle collision avoidance system 500. In one embodiment, the system 100 can be for use in an underground mining area, while the system 500 is used in an open pit or surface mining area. Alternatively, the system 500 can be used in the underground mining area and can represent the system 100 described above. The system 500 can include a proximity sensing unit 518 that is one of the proximity detection units 118 described above onboard a mining vehicle 510. Optionally, the sensing unit 518 shown in FIG. 5 can represent a receiver unit 136 described above. The sensing unit 518 operates to determine whether other objects are near the vehicle 510 such that movement of the vehicle 510 needs to be altered to avoid collision with the object(s). For example, the sensing unit 518 can emit EM pulses and RF signals that are detected by a receiver unit 136 to determine the proximity of other objects to the sensing unit 518 and, therefore, the vehicle 510, as described above. Alternatively, the sensing unit 518 can receive the EM pulses and/or RF signals to determine the proximity of other objects to the sensing unit 518 and, therefore, the vehicle 510, as described above. Alternatively, the sensing unit 518 can use another technique, such as GPS, radar, or the like, to determine the proximity of other objects to the sensing unit 518 and, therefore, the vehicle 510, as described above. With respect to GPS, the sensing unit 518 can communicate with sensing units 518 onboard or carried by other objects to share headings and/or positions of the sensing units 518 to determine the proximity of other objects to the sensing unit 518 and, therefore, the vehicle 510.

The control unit or processing module of the sensing unit 518 controls operation of the sensing unit 518. This control unit or processing module of the sensing unit 518 can be referred to as a controller of the sensing unit 518. The controller can represent the control unit 122 or the processing module 142. The controller can generate output to warn an operator to slow movement, stop movement, or change a direction of movement of the vehicle 510 based on the detected proximity of other objects. Optionally, the control unit can automatically slow movement, stop movement, or change the direction of movement of the vehicle 510 based on the detected proximity of other objects.

The controller of the sensing unit 518 defines protection points around the exterior body of the vehicle 510. These protection points are labeled in FIG. 5 as a front left (FL) point, a front right (RF) point, a rear left (RL) point, and a rear right (RR) point. The protection points can be defined based on known outer dimensions of the body of the vehicle 510. For example, the controller can define the protection points by measuring designated distances from a center location 506 of the vehicle 510 along orthogonal (e.g., x and y) axes 502, 504. This center location 506 can be located midway between the opposite ends of the vehicle 510 along the axis 502 and midway between the opposite sides of the vehicle 510 along the axis 504. For example, the front protection points FL, FR can be located the same distance from the axis 502 as the rear protection points RL, RR, and the right protection points FR, RR can be located the same distance from the axis 504 as the left protection points FL, RL. Optionally, the controller can define the protection points based on designated distances and angles from the center location 506. For example, the front right protection point FR can be a designated distance at a first angle in a counter-clockwise direction from the axis 502, the front left protection point FL can be the same or another designated distance at the same first angle in a clockwise direction from the axis 502 (or at a second angle that is ninety degrees greater than the first angle in a counter-clockwise direction from the axis 502), the rear left protection point RL can be a designated distance at a third angle in a counter-clockwise direction from the axis 502, and the rear right protection point RR can be the same or another designated distance at the same first angle in a clockwise direction from the axis 502 (or at a fourth angle that is ninety degrees greater than the third angle in a clockwise direction from the axis 502).

These designated distances can be increased axis for longer vehicles 510 and/or for wider vehicles 510. Optionally, the designated angles may change for longer and/or wider vehicles 510. The protection points can be defined to be outside of the outer surfaces of the vehicle 510. As shown in FIG. 5, the front protection points FL, FR can be located in a two-dimensional plane that is in front of or intersects the outermost surface of the leading end of the vehicle 510. The rear protection points RL, RR can be located in a two-dimensional plane that is in front of or intersects the outermost surface of the opposite trailing end of the vehicle 510 in one embodiment. The protection points can define an outer boundary of the vehicle 510. Entry of other objects into this outer boundary can result in collision with the vehicle 510.

The controller can define protection zones around the vehicle 510 based on the locations of the protection points and/or the speed at which the vehicle 510 is moving. In the illustrated example, three different types of protection zones are defined around the vehicle 510. These protection zones include a compulsory action zone 512, conditional action zones 514, and no-action change zones 516. Alternatively, fewer protection zones may be defined, more protection zones may be defined, fewer different types of protection zones may be defined, and/or more different types of protection zones may be defined. As described above, the different types of zones 512, 514, 516 are associated with different responsive actions to be taken (or that are not taken) if another object is detected within different types of protection zones 512, 514, 516.

The controller can define the compulsory action zone 512 as a surface area or a three-dimensional volume of space extending ahead of the leading end of the vehicle 510 between the front protection points FR, FL, as shown in FIG. 5. This surface area can be disposed on the surface of the route being traveled by the vehicle 510 or can be parallel to the route surface but elevated above the route surface by a designated distance (e.g., one half meter or another distance). The volume of space can extend from the route surface (or a plane that is parallel to the route surface) to a designated height above the route surface, such as the height of the vehicle 510 above the route surface (or another height). The controller can define the compulsory action zone 512 to extend ahead of the vehicle 510 to outer ends of stop protection lines 524, which are described below.

The controller can define the no-action zones 516 as surface areas or three-dimensional volumes of space extending laterally outward from opposite sides of the vehicle 510 (relative to a direction of travel 522 of the vehicle 510), as shown in FIG. 5. These surface areas can be disposed on the surface of the route being traveled by the vehicle 510 or can be parallel to the route surface but elevated above the route surface by a designated distance. The volumes of space can extend from the route surface (or a plane that is parallel to the route surface) to the designated height above the route surface. The controller can define the no-action zones 516 to outward from the sides of the vehicle 510 to a designated distance, such as the length of the stop protection lines 524, described below.

The controller can define the conditional action zones 514 as surface areas or three-dimensional volumes of space extending along the axis 504 from the plane that includes the front protection points FL, FR (and the front end of the plane of the no-action zones 516) to distances of the stop protection lines 524. The controller also can define one of the conditional action zones 514 as the surface area or three-dimensional volume of space extending along the axis 502 from the plane that includes left protection points FL, RL to distances of the stop protection lines 524. The controller can define the other conditional action zone 514 as the surface area or three-dimensional volume of space extending along the axis 502 from the plane that includes right protection points FR, RR to distances of the stop protection lines 524. The conditional action zone 514 that is disposed to the right side of the axis 504 in FIG. 5 can be referred to as the first quadrant or quadrant one of the vehicle 510, while the other conditional action zone 514 that is disposed to the left side of the axis 504 in FIG. 5 can be referred to as the second quadrant or quadrant two of the vehicle 510.

As shown in FIG. 5, the protection zones do not overlap with each other. Alternatively, two or more of the protection zones may at least partially overlap with each other.

While the previous description focuses on the designated distances that are used to define the sizes of the protection zones being the lengths of the stop protection lines, alternatively, these designated distances can be the lengths of slow protection lines 520, which are described below.

The controller can define stop and slow protection lines 524, 520 as lines that linearly project from the leading edge of the vehicle 510 in directions parallel to the axis 504 and/or as lines that linearly project from the lateral sides of the vehicle 510 in directions parallel to the axis 502. The leading edge of the vehicle 510 can be the two-dimensional plane that includes the front protection points FL, FR while the vehicle 510 is moving forward in the direction 522 or can be the two-dimensional plane that includes the rear protection points RL, RR while the vehicle 510 is moving rearward in a direction that is opposite of the direction 522. The lateral sides of the vehicle 510 can be the two-dimensional planes on either side of the vehicle 510, with one plane including the left protection points FL, RL and the other plane including the right protection points FR, RR.

For example, the stop protection lines 524 can project in directions parallel to the moving direction 522 of the vehicle 510 from the front protection points FR, FL to distances of the stop protection lines 524 (described below), while the vehicle 510 is moving forward. The stop protection lines 524 can project in opposite directions from the rear protection points RR, RL to distances of the stop protection lines 524 (described below), while the vehicle 510 is moving backward. Additional stop protection lines 524 optionally can project on one side of the vehicle 510 in directions that are perpendicular to the moving direction 522 from the right protection points FR, RR to distances of the stop protection lines 524. Additional stop protection lines 524 optionally can project on the other side of the vehicle 510 in directions that are perpendicular to the moving direction 522 from the left protection points FL, RL to distances of the stop protection lines 524.

The slow protection lines 520 can project in directions parallel to the moving direction 522 of the vehicle 510 from the front protection points FR, FL to distances of the slow protection lines 520 (described below), while the vehicle 510 is moving forward. The slow protection lines 520 can project in opposite directions from the rear protection points RR, RL to distances of the slow protection lines 520 (described below), while the vehicle 510 is moving backward. Additional slow protection lines 520 optionally can project on one side of the vehicle 510 in directions that are perpendicular to the moving direction 522 from the right protection points FR, RR to distances of the slow protection lines 520. Additional slow protection lines 520 optionally can project on the other side of the vehicle 510 in directions that are perpendicular to the moving direction 522 from the left protection points FL, RL to distances of the slow protection lines 520.

The controller can define the lengths or distances of the protection lines 524, 520 based on the moving speed of the vehicle 510. The protection lines 524, 520 can be longer for faster moving speeds of the vehicle 510, and shorter for slower moving speeds of the vehicle 510. In one embodiment, the lengths of the protection lines 524, 520 are based on the stopping distance of the vehicle 510. For example, the stopping distance (sd) of the vehicle 510 can be determined by the controller based on:

$$sd = vt + \frac{v^2}{2g(\text{coeff of friction} + \text{gradient})(\text{brake ratio})}$$

where v represents the moving speed of the vehicle 510, t represents time to stop the vehicle 510, g represents gravitational acceleration, coeff of friction+gradient represents the combined value of the coefficient of friction and the gradient on which the vehicle 510 is traveling, and brake ratio is the braking ratio of the vehicle 510 (e.g., the ratio of the braking force to the weight of the vehicle 510). Alternatively, the braking distance can have a defined, designated value that is not calculated, but that is obtained from several different distances associated with different moving speeds of the vehicle 510 (e.g., default stopping distances for different vehicle speeds).

The length or distance of the stop protection lines 524 can be equal to the length of the stopping distance in one embodiment. Alternatively, the length or distance of the stop protection lines 524 can be a percentage of the stopping distance, such as 125%, 110%, 90%, or the like, of the stopping distance. The length of the slow protection lines 520 can be equal to twice the length of the stopping distance in one embodiment. Alternatively, the length or distance of the slow protection lines 520 can be another percentage of the stopping distance, such as 225%, 210%, 190%, or the like, of the stopping distance. As shown in FIG. 5, the slow protection lines 520 extend farther from the vehicle 510 than the stop protection lines 524.

The controllers of the detection units 518 onboard other vehicles 510 can similarly identify or define protection lines 520, 524 and/or protection zones 512, 514, 516. Because the vehicles 510 may be different sizes and/or move at different speeds, the protection lines 520, 524 and/or zones 512, 514, 516 for different vehicles 510 may have different sizes and/or shapes. The sizes and/or shapes of the protection lines 520, 524 and/or zones 512, 514, 516 for a vehicle 510 may dynamically change (by the controller of the vehicle 510) due to changing speeds of the vehicle 510.

The protection lines and/or zones that are defined by the controllers can be monitored lines or zones, and not tangible objects. For example, a protection line and/or zone can define spatial locations that are monitored for other objects by a controller to avoid collision with a vehicle.

The controllers of the different detection units 518 can communicate the protection lines and/or zones with each other. For example, the controllers onboard different vehicles 510 can transmit the protection lines and/or zones for the respective vehicle to the controller of one or more other vehicles 510. Optionally, the controllers onboard different vehicles 510 can broadcast the protection lines and/or zones for the respective vehicle to the controllers of other vehicles 510. In another example, the controllers onboard different vehicles 510 can communicate the protection lines and/or zones for the respective vehicle to a central memory or database that is accessible by the controllers of other vehicles 510.

The controller of a first vehicle 510 can monitor locations of other vehicles 510 relative to the first vehicle 510 using the protection lines and/or zones. The first vehicle 510 can be referred to as a vehicle under test while the other vehicles can be referred to as monitored vehicles. For example, responsive to detecting that a protection line and/or a protection zone of a monitored vehicle 510 intersects, enters into, and/or overlaps with the protection line and/or a protection zone of the test vehicle 510, the controller of the test vehicle 510 can instruct the operator of the test vehicle 510 to change movement of the test vehicle 510 or can automatically change movement of the test vehicle 510 to avoid collision with the monitored vehicle 510. This change in movement can be slowing or stopping the test vehicle 510, changing the direction in which the test vehicle 510 is moving, and/or instructing the monitored vehicle 510 to change movement.

Figure 6:
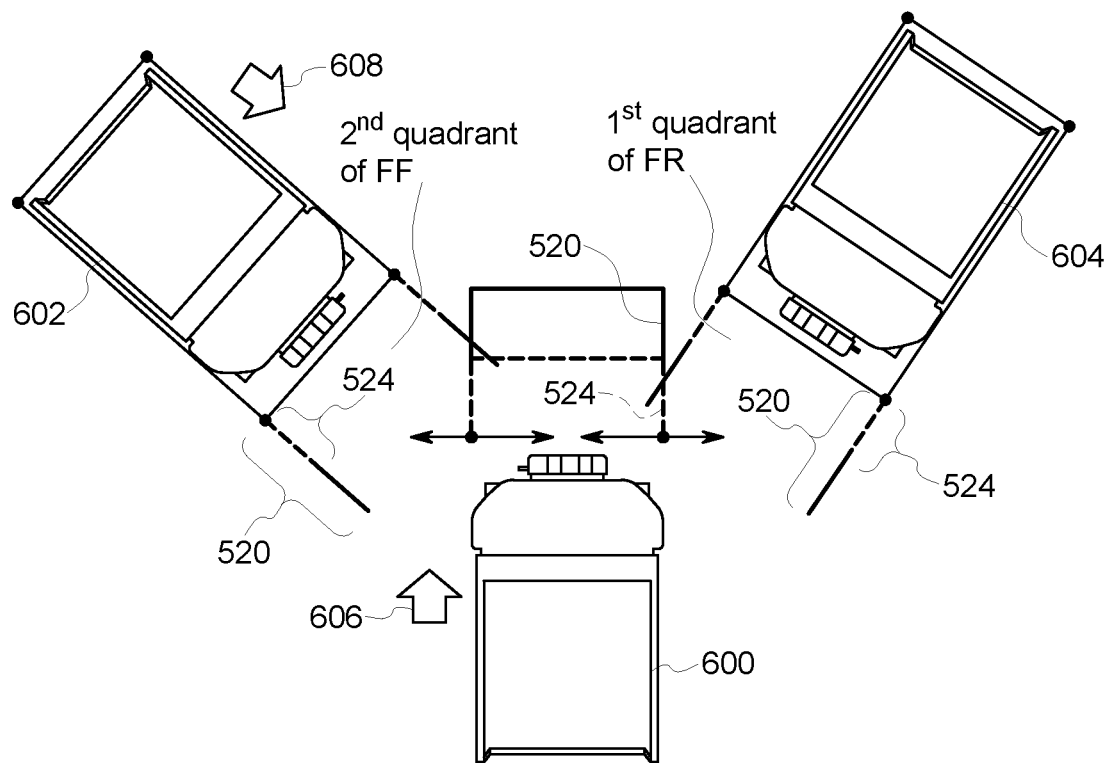
FIG. 6 illustrates one example of operation of the collision avoidance system.

FIG. 6 illustrates one example of operation of the collision avoidance system. In FIG. 6, three vehicles 600, 602, 604 are shown, with each vehicle 600, 602, 604 representing one of the vehicles 510 shown in FIG. 5. The vehicle 600 is the test vehicle, while the vehicles 602, 604 are the monitored vehicles. The vehicle 600 is moving in a first direction of travel 606 and the vehicle 602 is moving in a different, second direction of travel 608. The slow and stop protection lines 520, 524 of the vehicles 600, 602, 604 are shown in FIG. 6.

The controller of the vehicle 600 monitors the protection zones 512, 514 to determine if any other vehicle 602, 604 or protection line or zone of another vehicle 602, 604 enters the zones 512, 514. The controller determines whether any protection zone or protection line of the vehicles 602, 604 intersects, crosses over, enters, or at least partially overlaps the first or second quadrant of the vehicle 600. The first quadrant is the front right conditional protection zone 514 and the second quadrant is the front left conditional protection zone 514, as described above.

The controller of the vehicle 600 can instruct the operator of the vehicle 600 to stop movement of the vehicle 600 or can automatically stop movement of the vehicle 600 responsive to any stop protection line 524 of the vehicle 600 intersecting or crossing over any stop protection line 524 of another vehicle 602, 604. But, the controller of the vehicle 600 can instruct the operator of the vehicle 600 to slow down movement of the vehicle 600 or can automatically slow down movement of the vehicle 600 responsive to any slow protection line 520 of the vehicle 600 intersecting or crossing over any stop protection line 524 or any slow protection line 524 of another vehicle 602, 604. If the controller determines that any stop protection line 524 intersects or crosses over a slow protection line 520 of another vehicle 602, 604 then the controller of the vehicle 600 may not instruct the operator to slow or stop movement of the vehicle 600, and the controller of the vehicle 600 may not automatically slow or stop movement of the vehicle 600.

In the illustrated example, the stop protection line 524 of the vehicle 600 on the right side of the vehicle 600 intersects the slow protection line 520 on the right side of the vehicle 604. In response to detecting this intersection, the controller of the vehicle 600 can instruct the operator to stop movement of the vehicle 600 or can automatically stop movement of the vehicle 600. Or, the controller of the vehicle 600 can instruct the operator to stop movement of the vehicle 600 and can automatically stop movement of the vehicle 600 responsive to the operator not stopping the vehicle 600 within a designated time limit or distance limit.

Additionally, the controller of the vehicle 600 may determine that the slow protection line 520 on the left side of the vehicle 600 intersects the slow protection line 520 on the left side of the vehicle 602. In response to detecting this intersection, the controller can instruct the operator to slow movement of the vehicle 600 or can automatically slow movement of the vehicle 600. Or, the controller of the vehicle 600 can instruct the operator to slow movement of the vehicle 600 and can automatically slow movement of the vehicle 600 responsive to the operator not slowing the vehicle 600 to at least a designated speed within a designated time limit or distance limit.

Figure 7:
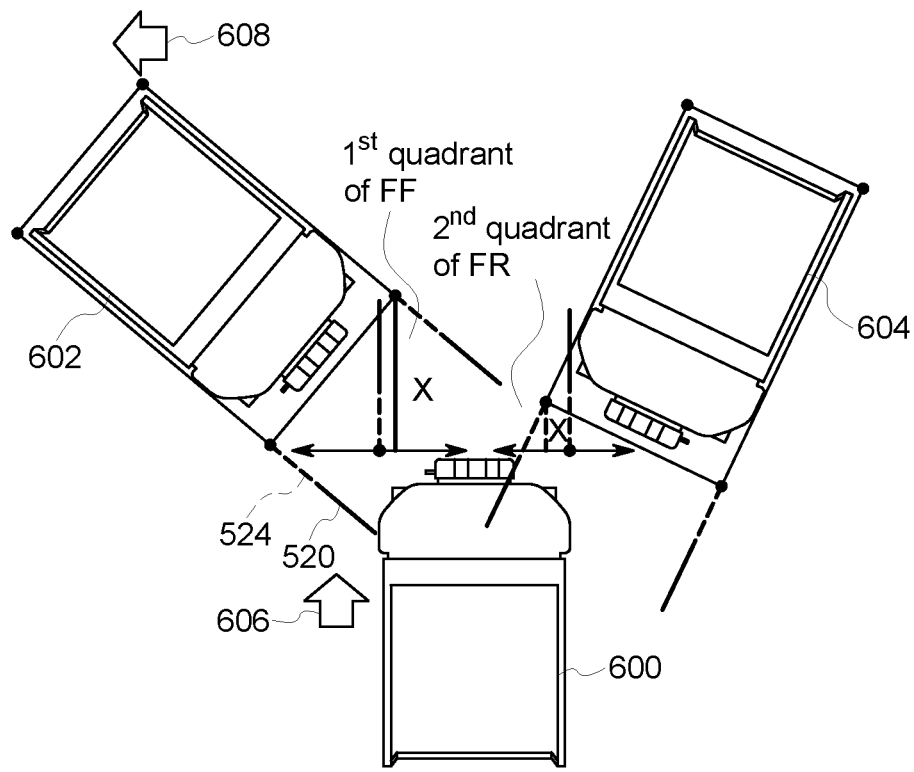
FIG. 7 illustrates another example of operation of the collision avoidance system.

FIG. 7 illustrates another example of operation of the collision avoidance system. The controller of the vehicle 600 can determine whether any protection point FR, FL, RR, RL of a monitored vehicle 602, 604 enters or intersects either of the protection zones 514 of the vehicle 600. Responsive to determining that a protection line 520, 524 or protection zone 512, 514 of another vehicle 602, 604 enters a protection zone 512, 514 of the vehicle 600, the controller can calculate a closing distance x between the vehicles 600 and 602 or 604.

This closing distance x can be the shortest linear distance between either of the front protection points FR, FL of the vehicle 602, 604 and the two-dimensional vertical plane that includes the front protection points FR, FL of the vehicle 600. Optionally, this closing distance x can be the shortest linear distance between either of the rear protection points RR, RL of the vehicle 602, 604 and the two-dimensional vertical plane that includes the front protection points FR, FL of the vehicle 600 if the vehicle 600 is approaching the back end of the vehicle 602, 604 and/or the vehicle 602, 604 is backing up. In another example, this closing distance x can be the shortest linear distance between either of the front protection points RR, RL of the vehicle 602, 604 and the two-dimensional vertical plane that includes the rear protection points RR, RL of the vehicle 600 if the vehicle 600 is backing up and/or the vehicle 602, 604 is approaching the back end of the vehicle 600.

The controller can instruct the operator to stop movement of the vehicle 600 (and automatically stop movement if the operator is not responsive within the time or distance limit) responsive to the closing distance x being less than a designated stop limit $L_{stop}$, where:

$$L_{stop} = sd_t + \cos(\text{rel heading}) \cdot sd_m$$

where $sd_t$ represents the stopping distance of the test vehicle 600, $sd_m$ represents the stopping distance of the monitored vehicle 602, 604, and rel heading is the relative heading of the vehicle 602, 604 to the vehicle 600. The relative heading can be the angle between the headings of the vehicle 600 and the vehicle 602 or 604 being monitored. The stopping distances $sd_t$ and $sd_m$ of the vehicles can be the lengths of the respective stop protection lines 524.

The controller can instruct the operator to slow movement of the vehicle 600 (and automatically slow movement if the operator is not responsive within the time or distance limit) responsive to the closing distance x being less than a designated slowing limit $L_{slow}$, where:

$$L_{slow} = sld_t + \cos(\text{rel heading}) \cdot sld_m$$

where $sld_t$ represents the slowing distance of the test vehicle 600, $sld_m$ represents the slowing distance of the monitored vehicle 602, 604, and rel heading is the relative heading of the vehicle 602, 604 to the vehicle 600. The slowing distances $sld_t$ and $sld_m$ of the vehicles can be the lengths of the respective slow protection lines 520.

Therefore, if the closing distance x is less than the slowing limit $L_{slow}$, then the controller directs and/or automatically slows movement of the vehicle 600. If the closing distance x is less than the stopping limit $L_{stop}$, then the controller directs and/or automatically stops movement of the vehicle 600.

Figure 8:
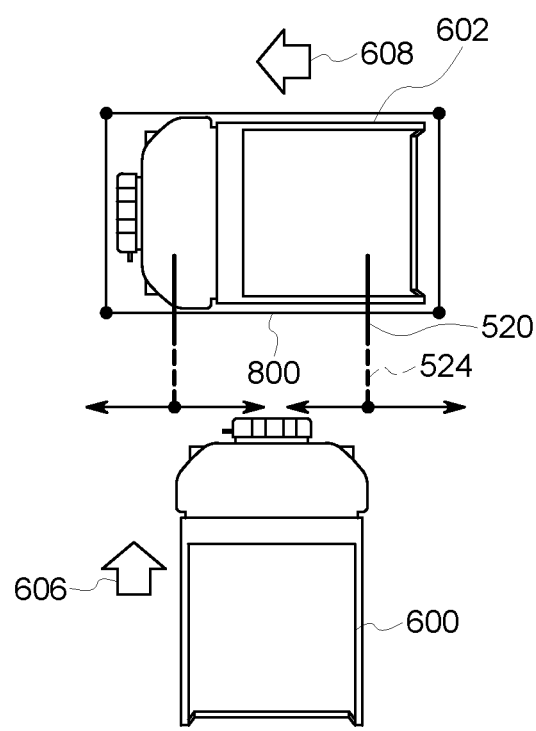
FIG. 8 illustrates another example of operation of the collision avoidance system.

FIG. 8 illustrates another example of operation of the collision avoidance system. The controller of the vehicle 600 can determine whether any protection line 520, 524 of the vehicle 600 intersects the body of another vehicle 602. The controller can make this determination by deciding whether the slow or stop protection lines 520, 524 of the vehicle 600 cross a two-dimensional plane 800 that includes both protection points of the vehicle 602 on one side of the vehicle 602. For example, the controller can identify one side of the vehicle 602 as a vertical plane that includes the left protection points FL, RL of the vehicle 602 (as shown in FIG. 8)

and/or the other side of the vehicle 602 as another vertical plane that includes the right protection points FR, RR of the vehicle 602.

The controller of the vehicle 600 can determine if the slow or stop protection lines 520, 524 of the vehicle 600 crosses over this plane between the protection points on one side of the vehicle 602. If the slow protection line 520 of the vehicle 600 intersects this plane of the vehicle 602, then the controller of the vehicle 600 can instruct the operator to slow movement of the vehicle 600 (and automatically slow movement if the operator is not responsive within the time or distance limit). If the stop protection line 524 of the vehicle 600 intersects this plane of the vehicle 602, then the controller of the vehicle 600 can instruct the operator to stop movement of the vehicle 600 (and automatically stop movement if the operator is not responsive within the time or distance limit). In the illustrated example, the controller determines that the slow protection line 520 intersects the side plane 800 of the vehicle 602. Accordingly, the controller directs the operator to slow movement of the vehicle 600 (and automatically slows movement if the operator is not responsive within the time or distance limit).

Figure 9A:
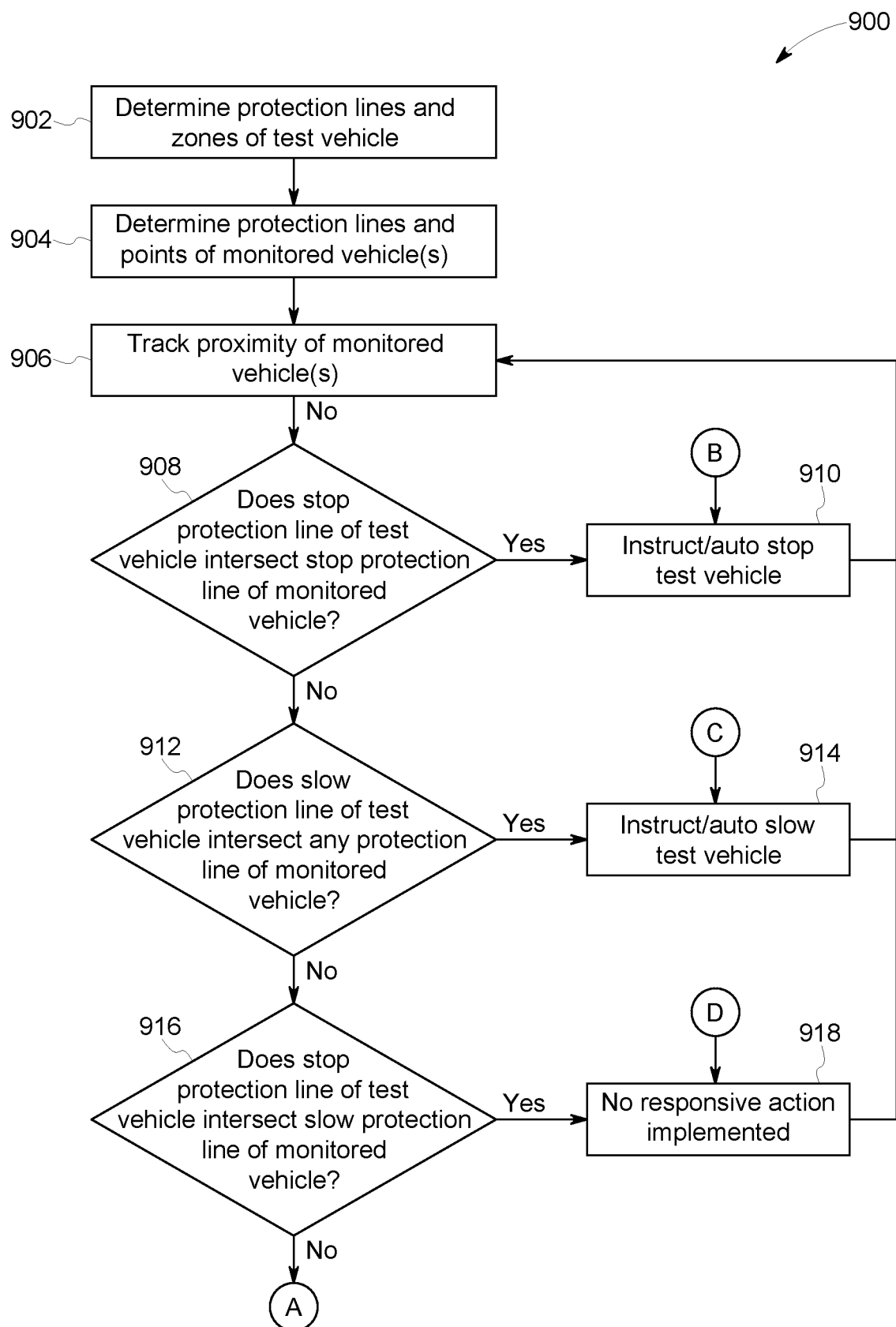
FIGS. 9A and 9B illustrate a flowchart of one embodiment of a method for avoiding collisions between mining vehicles.
Figure 9B:
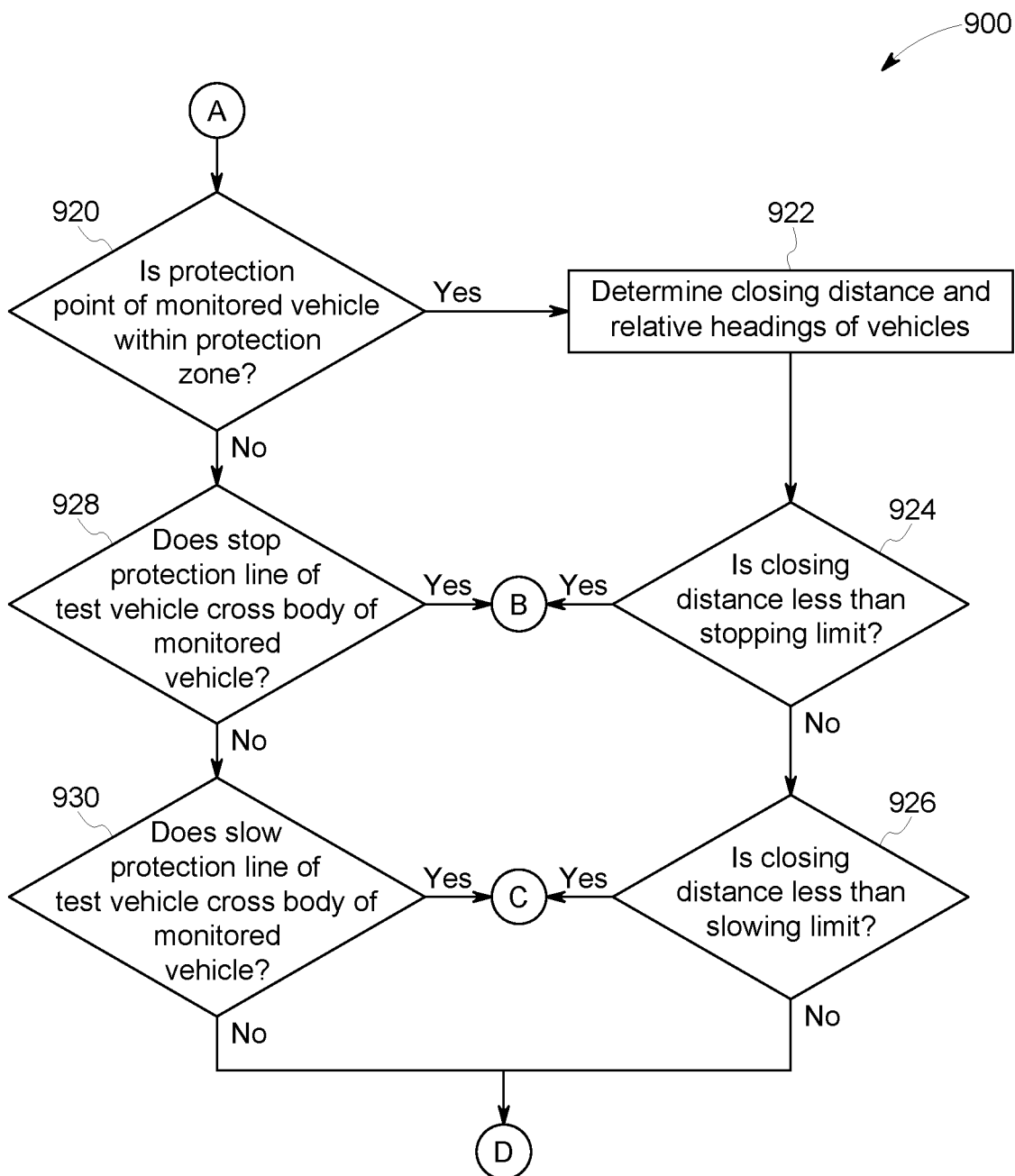

FIGS. 9A and 9B illustrate a flowchart of one embodiment of a method 900 for avoiding collisions between mining vehicles. The method 900 can represent the operations performed by the detection units described herein. While the method 900 is described as used to avoid collision between mining vehicles, the method 900 also can be used to avoid collision between other types of vehicles, between a vehicle and a non-vehicular object, or the like. Additionally, the method 900 is described as a sequence of decisions to determine whether to implement responsive actions to avoid collisions. But, the decisions may be performed in a sequence other than the sequence shown in the flowchart. The decisions may be performed concurrently and/or simultaneously instead of sequentially in another embodiment.

At 902, protection lines and zones of a test vehicle are determined. The controller can identify the slow and stop protection lines of a test vehicle, as well as the compulsory, conditional, and/or no-action zones of the test vehicle. At 904, the protection lines and/or points of one or more other vehicles are determined. For example, the protection points and lines of monitored vehicles are identified, as described above. At 906, the proximity of one or more of the monitored vehicles is tracked. The detection unit can monitor how close the protection points and/or lines are from the protection lines and/or zones of the test vehicle.

At 908, a determination is made as to whether a stop protection line of the test vehicle intersects a stop protection line of a monitored vehicle. If this intersection of stop protection lines is detected, then the vehicles may be in threat of an imminent collision. As a result, flow of the method 900 can proceed toward 910. Otherwise, the vehicles may not be in threat of an imminent collision, and flow of the method 900 can proceed toward 912.

At 910, the test vehicle is manually or automatically stopped. The controller can instruct the operator of the test vehicle via an output device (e.g., a speaker, light, display, or the like) to stop movement of the test vehicle. Alternatively, the controller can automatically stop movement of the test vehicle without operator intervention. In another embodiment, the controller can change movement of the test vehicle, such as by changing a heading of the test vehicle to avoid collision with the monitored vehicle. Flow of the method 900 can then return toward 906 to continue tracking the proximity of other vehicles, or the method 900 can terminate.

Returning to the decision made at 908, if no stop protection line of the test vehicle intersects a stop protection line of a monitored vehicle, then, at 912, a determination is made as to whether a slow protection line of the test vehicle intersects a stop or slow protection line of a monitored vehicle. If either slow protection line of the test vehicle intersects a stop or slow protection line of a monitored vehicle, then the test and monitored vehicles may be moving toward an eventual collision. As a result, flow of the method 900 can proceed toward 914. Otherwise, the vehicles may not be traveling toward a collision, and flow of the method 900 can proceed toward 916.

At 914, the test vehicle is manually or automatically slowed. The controller can instruct the operator of the test vehicle via an output device to slow movement of the test vehicle. Alternatively, the controller can automatically slow movement of the test vehicle without operator intervention. In another embodiment, the controller can change movement of the test vehicle, such as by changing a heading of the test vehicle to avoid collision with the monitored vehicle. Flow of the method 900 can then return toward 906 to continue tracking the proximity of other vehicles, or the method 900 can terminate.

Returning to the decision made at 912, if no slow protection line of the test vehicle intersects a protection line of a monitored vehicle, then, at 916, a determination is made as to whether a stop protection line of the test vehicle intersects a slow protection line of a monitored vehicle. If a stop protection line of the test vehicle intersects a slow protection line of a monitored vehicle, then the test and monitored vehicles may still not be near enough to pose a collision risk. As a result, flow of the method 900 can proceed toward 918. Otherwise, flow of the method 900 can proceed toward 920 (FIG. 9B).

At 918, no responsive action is implemented to change movement of the test vehicle. For example, the test and monitored vehicles may not be at risk for collision, so movement of the test vehicle can continue without slowing the test vehicle, stopping the test vehicle, or changing a heading of the test vehicle. Flow of the method 900 can then return toward 906 to continue tracking the proximity of other vehicles, or the method 900 can terminate.

At 920, a determination is made as to whether any protection point of the monitored vehicle is within a protection zone of the test vehicle. For example, the controller of the test vehicle can determine whether any of the protection points FR, FL, RR, RL of the monitored vehicle is within any conditional or compulsory protection zone 512, 514 of the test vehicle. If a protection point is within one of these protection zones, then the vehicles may be at risk of an imminent collision. As a result, flow of the method 900 can proceed toward 922. If a protection point is not within one of these protection zones, then the vehicles may not be at risk of an imminent collision. As a result, flow of the method 900 can proceed toward 928.

At 922, a closing distance between the test and monitored vehicle is determined, along with a relative heading of the vehicles, as described above. At 924, a determination is made as to whether this closing distance is less than a stopping limit of the test vehicle. If the closing distance is less than the stopping limit, then the vehicles may be at risk of an imminent collision. As a result, flow of the method 900 can proceed toward 910 to stop movement of the test vehicle, as described above. Otherwise, the vehicles may not be in threat of an imminent collision, and flow of the method 900 can proceed toward 926.

At 926, a determination is made as to whether this closing distance is less than a slowing limit of the test vehicle. If the closing distance is less than the slowing limit, then the vehicles may be moving toward an eventual collision. As a result, flow of the method 900 can proceed toward 914 to slow movement of the test vehicle, as described above. Otherwise, the vehicles may not be moving toward a collision, and flow of the method 900 can proceed toward 918, described above.

Returning to the description of the decision made at 920, if no protection point of a monitored vehicle is within a protection zone of the test vehicle, then flow of the method 900 can proceed toward 928. At 928, a determination is made as to whether a stop protection line of the test vehicle crosses the body of a monitored vehicle. For example, the controller can determine if a stop protection line of the test vehicle crosses or intersects a plane extending from and including the front and rear protection points on the same side of the monitored vehicle. If a stop protection line crosses or intersects this plane, then the vehicles may be at risk of an imminent collision. As a result, flow of the method 900 can proceed toward 910 to stop movement of the test vehicle, as described above. If no stop protection line of the test vehicle crosses or intersects this plane, then the vehicles may not be at risk of an imminent collision but may be moving toward a collision. As a result, flow of the method 900 can flow toward 930.

At 930, a determination is made as to whether a slow protection line of the test vehicle crosses the body of a monitored vehicle. For example, the controller can determine if a stop protection line of the test vehicle crosses or intersects the plane extending from and including the front and rear protection points on the same side of the monitored vehicle. If a slow protection line crosses or intersects this plane, then the vehicles may be moving toward a collision. As a result, flow of the method 900 can proceed toward 914 to slow movement of the test vehicle, as described above. If no slow protection line of the test vehicle crosses or intersects this plane, then the vehicles may not be moving toward a collision. As a result, flow of the method 900 can flow toward 918.

The collision avoidance systems and methods described herein can reduce the number of false alarms present in some know collision avoidance systems. The collision avoidance systems described herein can reduce false alarms by defining protection lines in the direction of movement of the test vehicle and by defining conditional and compulsory slow and stop protection zones around protection points of the vehicle. The controller can stop the vehicle as last resort but can use early detection of a collision hazard to slow the vehicle before stopping movement of the vehicle. The controller can define no slow or stop zones around the vehicle so that unnecessary alarms can be reduced based on the position and heading of the other vehicle.

In one embodiment, a mining vehicle control system includes a control unit configured to be disposed onboard a mining vehicle to control movement of the mining vehicle and one or more transceiver devices configured to emit an electromagnetic (EM) pulse and a radio frequency (RF) signal from the mining vehicle. The one or more transceiver devices are configured to emit the RF signal with an identity of the mining vehicle included in the RF signal. Responsive to a receiver unit disposed off-board the mining vehicle in a mine receiving the EM pulse and the RF signal, the control unit is configured to determine a distance between the mining vehicle and the receiver unit based on the EM pulse and the RF signal that are received, and to communicate a signal to the one or more transceiver devices based on the distance. The control unit also is configured to change the movement of the mining vehicle based on the distance.

Optionally, the control unit is configured to one or more of slow the movement of the mining vehicle, stop the movement of the mining vehicle, or change a direction of the movement of the mining vehicle based on the signal received from the receiver unit. The one or more transceiver devices can be configured to receive the signal from the receiver unit disposed onboard another mining vehicle. The one or more transceiver devices can be configured to receive the signal from the receiver unit carried by a person located in the mine.

In one embodiment, a mining vehicle control system includes a detection unit configured to determine a proximity of a monitored mining vehicle to a first mining vehicle and a controller configured to determine first protection lines that linearly project from the first mining vehicle and second protection lines that linearly project from the monitored mining vehicle. The first protection lines are determined based on a moving speed of the first mining vehicle. The second protection lines are determined based on a moving speed of the monitored mining vehicle. The controller is configured to direct the first mining vehicle to change movement of the first mining vehicle responsive to intersection of one or more of the first protection lines with one or more of the second protection lines.

Optionally, the first protection lines that are determined can include longer first slow protection lines and shorter first stop protection lines. The second protection lines that are determined can include longer second slow protection lines and shorter second stop protection lines. The controller can be configured to direct the first mining vehicle to stop the movement of the first mining vehicle responsive to detection of intersection of at least one of the first stop protection lines with at least one of the second stop protection lines. The controller can be configured to direct the first mining vehicle to slow the movement of the first mining vehicle responsive to detection of intersection of at least one of the first slow protection lines with any of the second slow protection lines or the second stop protection lines.

The controller can be configured to determine the second protection lines as linearly extending away from protection points associated with a body of the monitored mining vehicle, and the controller is configured to define protection zones outside of the first mining vehicle and extending between the first protection lines. The controller can be configured to determine whether one or more of the protection points of the monitored mining vehicle enter one or more of the protection zones of the first mining vehicle. The controller can be configured to determine a closing distance of the monitored mining vehicle and a relative heading between the first mining vehicle and the monitored mining vehicle responsive to determining that the one or more protection points of the monitored mining vehicle entered the one or more protection zones of the first mining vehicle. The controller can be configured to direct the first mining vehicle to slow or stop the movement of the first mining vehicle based on the closing distance, the relative heading, and one or more of a stopping or slowing limit of the test vehicle.

In one embodiment, a method for avoiding collision between mining vehicles is provided. The method includes determining a proximity of a monitored mining vehicle to a first mining vehicle and determining first protection lines that linearly project from the first mining vehicle. The first protection lines are determined based on a moving speed of the first mining vehicle. The method also includes determining second protection lines that linearly project from the monitored mining vehicle. The second protection lines are determined based on a moving speed of the monitored mining vehicle. The method also includes changing movement of the first mining vehicle responsive to intersection of one or more of the first protection lines with one or more of the second protection lines.

Optionally, determining the first protection lines can include determining longer first slow protection lines and shorter first stop protection lines. Determining the second protection lines can include determining longer second slow protection lines and shorter second stop protection lines. Changing the movement of the first mining vehicle can include stopping the movement of the first mining vehicle responsive to detection of intersection of at least one of the first stop protection lines with at least one of the second stop protection lines.

Changing the movement of the first mining vehicle can include slowing the movement of the first mining vehicle responsive to detection of intersection of at least one of the first slow protection lines with any of the second slow protection lines or the second stop protection lines. Determining the second protection lines can include determining linear projections of the second protection lines that extend away from protection points associated with a body of the monitored mining vehicle. The method optionally can include determining protection zones outside of the first mining vehicle and extending between the first protection lines. The method also can include determining whether one or more of the protection points of the monitored mining vehicle enter one or more of the protection zones of the first mining vehicle.

Optionally, the method includes determining a closing distance of the monitored mining vehicle and a relative heading between the first mining vehicle and the monitored mining vehicle responsive to determining that the one or more protection points of the monitored mining vehicle entered the one or more protection zones of the first mining vehicle. Changing the movement of the first mining vehicle can include slowing or stopping the movement of the first mining vehicle based on the closing distance, the relative heading, and one or more of a stopping or slowing limit of the first mining vehicle.

While embodiments of the invention are suitable for use with both mobile and stationary implementations, for ease of explanation a mobile implementation is described in detail herein. More specifically, a mining vehicle has been selected for clarity of illustration for the disclosure of mobile embodiments. Other suitable vehicles include, for example, automobiles and other on-road vehicles, locomotives, construction vehicles/equipment, and other off-road vehicles, marine vessels, and autonomous vehicles (e.g., driverless automobiles). As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
   a control unit configured to be disposed onboard a vehicle to control movement of the vehicle; and
   one or more transceiver devices configured to emit an electromagnetic (EM) pulse and a radio frequency (RF) signal from the vehicle, the one or more transceiver devices configured to emit the RF signal with an identity of the vehicle included in the RF signal,
   wherein, responsive to a receiver unit disposed off-board the vehicle along a route receiving the EM pulse and the RF signal, the control unit is configured to determine a distance between the vehicle and the receiver unit based on the EM pulse and the RF signal that are received, and to communicate a signal to the one or more transceiver devices based on the distance, wherein the control unit also is configured to change the movement of the vehicle based on the distance.

2. The vehicle control system of claim 1, wherein the control unit is configured to one or more of slow the movement of the vehicle, stop the movement of the vehicle, or change a direction of the movement of the vehicle based on the signal received from the receiver unit.

3. The vehicle control system of claim 1, wherein the one or more transceiver devices are configured to receive the signal from the receiver unit disposed onboard another vehicle.

4. The vehicle control system of claim 1, wherein the one or more transceiver devices are configured to receive the signal from the receiver unit carried by a person located along the route.

5. A vehicle control system comprising:
   a detection unit configured to determine a proximity of a monitored vehicle to a first vehicle; and
   a controller configured to determine first protection lines that linearly project from the first vehicle and second protection lines that linearly project from the monitored vehicle, the first protection lines determined based on a moving speed of the first vehicle, the second protection lines determined based on a moving speed of the monitored vehicle,
   wherein the controller is configured to direct the first vehicle to change movement of the first vehicle responsive to intersection of one or more of the first protection lines with one or more of the second protection lines.

6. The vehicle control system of claim 5, wherein the first protection lines that are determined include longer first slow protection lines and shorter first stop protection lines, and wherein the second protection lines that are determined include longer second slow protection lines and shorter second stop protection lines.

7. The vehicle control system of claim 6, wherein the controller is configured to direct the first vehicle to stop the movement of the first vehicle responsive to detection of intersection of at least one of the first stop protection lines with at least one of the second stop protection lines.

8. The vehicle control system of claim 6, wherein the controller is configured to direct the first vehicle to slow the movement of the first vehicle responsive to detection of intersection of at least one of the first slow protection lines with any of the second slow protection lines or the second stop protection lines.

9. The vehicle control system of claim 5, wherein the controller is configured to determine the second protection lines as linearly extending away from protection points associated with a body of the monitored vehicle, and the controller is configured to define protection zones outside of the first vehicle and extending between the first protection lines.

10. The vehicle control system of claim 9, wherein the controller is configured to determine whether one or more of the protection points of the monitored vehicle enter one or more of the protection zones of the first vehicle.

11. The vehicle control system of claim 10, wherein the controller is configured to determine a closing distance of the monitored vehicle and a relative heading between the first vehicle and the monitored vehicle responsive to determining that the one or more protection points of the monitored vehicle entered the one or more protection zones of the first vehicle.

12. The vehicle control system of claim 11, wherein the controller is configured to direct the first vehicle to slow or stop the movement of the first vehicle based on the closing distance, the relative heading, and one or more of a stopping or slowing limit of the test vehicle.

13. A method for avoiding collision between vehicles, the method comprising:
   determining a proximity of a monitored vehicle to a first vehicle;
   determining first protection lines that linearly project from the first vehicle, the first protection lines determined based on a moving speed of the first vehicle;
   determining second protection lines that linearly project from the monitored vehicle, the second protection lines determined based on a moving speed of the monitored vehicle; and
   changing movement of the first vehicle responsive to intersection of one or more of the first protection lines with one or more of the second protection lines.

14. The method of claim 13, wherein determining the first protection lines includes determining longer first slow protection lines and shorter first stop protection lines, and wherein determining the second protection lines includes determining longer second slow protection lines and shorter second stop protection lines.

15. The method of claim 14, wherein changing the movement of the first vehicle includes stopping the movement of the first vehicle responsive to detection of intersection of at least one of the first stop protection lines with at least one of the second stop protection lines.

16. The method of claim 14, wherein changing the movement of the first vehicle includes slowing the movement of the first vehicle responsive to detection of intersection of at least one of the first slow protection lines with any of the second slow protection lines or the second stop protection lines.

17. The method of claim 13, wherein determining the second protection lines includes determining linear projections of the second protection lines that extend away from protection points associated with a body of the monitored vehicle, and further comprising deter protection zones outside of the first vehicle and extending between the first protection lines.

18. The method of claim 17, further comprising determining whether one or more of the protection points of the monitored vehicle enter one or more of the protection zones of the first vehicle.

19. The method of claim 18, further comprising determining a closing distance of the monitored vehicle and a relative heading between the first vehicle and the monitored vehicle responsive to determining that the one or more protection points of the monitored vehicle entered the one or more protection zones of the first vehicle.

20. The method of claim 19, wherein changing the movement of the first vehicle includes slowing or stopping the movement of the first vehicle based on the closing distance, the relative heading, and one or more of a stopping or slowing limit of the first vehicle.

\* \* \* \* \*